United States Patent
Sugden et al.

(10) Patent No.: US 10,083,540 B2
(45) Date of Patent: *Sep. 25, 2018

(54) VIRTUAL LIGHT IN AUGMENTED REALITY

(71) Applicant: Microsoft Technology Licensing, LLC, Redmond, WA (US)

(72) Inventors: Ben Sugden, Woodinville, WA (US); Darren Bennett, Seattle, WA (US); Brian Mount, Seattle, WA (US); Sebastian Sylvan, Seattle, WA (US); Arthur Tomlin, Kirkland, WA (US); Ryan Hastings, Seattle, WA (US); Daniel McCulloch, Kirkland, WA (US); Kevin Geisner, Mercer Island, WA (US); Robert Crocco, Jr., Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,888

(22) Filed: Jan. 23, 2017

(65) Prior Publication Data

US 2017/0161939 A1   Jun. 8, 2017

Related U.S. Application Data

(63) Continuation of application No. 14/520,567, filed on Oct. 22, 2014, now Pat. No. 9,551,871, which is a
(Continued)

(51) Int. Cl.
*G06T 15/60* (2006.01)
*G06T 19/00* (2011.01)
(Continued)

(52) U.S. Cl.
CPC .......... *G06T 15/60* (2013.01); *G02B 27/0172* (2013.01); *G06T 7/11* (2017.01);
(Continued)

(58) Field of Classification Search
CPC .. G06T 15/60; G06T 7/73; G06T 7/60; G06T 7/11; G06T 19/006; G06T 2215/16;
(Continued)

(56) References Cited

U.S. PATENT DOCUMENTS 2,763,772 A    9/1956  Hine
5,737,031 A    4/1998  Tzidon et al.
(Continued)

FOREIGN PATENT DOCUMENTS

CN    101002253 A    7/2007
DE    102009037835 A1    2/2011

OTHER PUBLICATIONS

Chin, N. et al., "Fast Object-Precision Shadow Generation for Area Light Sources Using BSP Trees," Proceedings of the 1992 Symposium on Interactive 3D Graphics, pp. 21-30, Mar. 1992, 10 pages.
(Continued)

*Primary Examiner* — Maurice L McDowell, Jr.
(74) *Attorney, Agent, or Firm* — Alleman Hall Creasman & Tuttle LLP (57) ABSTRACT

A head-mounted display system includes a see-through display that is configured to visually augment an appearance of a physical environment to a user viewing the physical environment through the see-through display. Graphical content presented via the see-through display is created by modeling the ambient lighting conditions of the physical environment.

20 Claims, 5 Drawing Sheets

Related U.S. Application Data continuation of application No. 13/309,358, filed on Dec. 1, 2011, now Pat. No. 8,872,853.

(51) Int. Cl.
*G06T 7/11* (2017.01)
*G06T 7/60* (2017.01)
*G06T 7/73* (2017.01)
*G02B 27/01* (2006.01)

(52) U.S. Cl.
CPC .............. *G06T 7/60* (2013.01); *G06T 7/73* (2017.01); *G06T 19/006* (2013.01); *G02B 2027/014* (2013.01); *G02B 2027/0118* (2013.01); *G02B 2027/0178* (2013.01); *G06T 2215/16* (2013.01)

(58) Field of Classification Search
CPC .......... G02B 27/0172; G02B 2027/014; G02B 2027/0118; G02B 2027/0178
See application file for complete search history.

(56) References Cited

U.S. PATENT DOCUMENTS

| | | | |
|---|---|---|---|
| 5,742,749 A | 4/1998 | Foran et al. | |
| 6,301,442 B1 | 10/2001 | Uchida et al. | |
| 6,307,526 B1 | 10/2001 | Mann | |
| 6,614,408 B1 | 9/2003 | Mann | |
| 6,933,948 B2 | 8/2005 | Gonsalves | |
| 7,301,547 B2 | 11/2007 | Martins et al. | |
| 7,508,455 B2 | 3/2009 | Liu et al. | |
| 7,623,137 B1 | 11/2009 | Miller | |
| 8,243,061 B2 | 8/2012 | Matsumura et al. | |
| 8,405,680 B1 | 3/2013 | Cardoso Lopes et al. | |
| 9,551,871 B2 * | 1/2017 | Sugden ................ | G02B 27/017 |
| 2002/0175914 A1 | 11/2002 | Marshall et al. | |
| 2003/0014212 A1 | 1/2003 | Ralston et al. | |
| 2005/0007460 A1 | 1/2005 | Stavely et al. | |
| 2005/0195332 A1 | 9/2005 | Sakagawa et al. | |
| 2006/0164523 A1 | 7/2006 | Jiang et al. | |
| 2007/0038944 A1 | 2/2007 | Carignano et al. | |
| 2007/0188522 A1 | 8/2007 | Tsuyuki | |
| 2007/0236485 A1 | 10/2007 | Trepte | |
| 2008/0044095 A1 | 2/2008 | Albiez | |
| 2008/0144962 A1 | 6/2008 | Jung et al. | |
| 2009/0128552 A1 | 5/2009 | Fujiki et al. | |
| 2009/0225001 A1 | 9/2009 | Biocca et al. | |
| 2009/0231548 A1 | 9/2009 | Kondo et al. | |
| 2009/0279178 A1 | 11/2009 | Cui | |
| 2010/0281436 A1 | 11/2010 | Kipman et al. | |
| 2010/0287500 A1 | 11/2010 | Whitlow et al. | |
| 2010/0295851 A1 | 11/2010 | Diamand | |
| 2011/0002508 A1 | 1/2011 | Basso et al. | |
| 2011/0213664 A1 | 9/2011 | Osterhout et al. | |
| 2011/0234619 A1 | 9/2011 | Tokunaga | |
| 2011/0234631 A1 | 9/2011 | Kim et al. | |
| 2012/0026079 A1 | 2/2012 | Maciesowicz et al. | |
| 2012/0092328 A1 | 4/2012 | Flaks et al. | |
| 2012/0176410 A1 | 7/2012 | Meier et al. | |
| 2013/0141434 A1 | 6/2013 | Sugden et al. | |
| 2013/0147826 A1 | 6/2013 | Lamb | |
| 2013/0208014 A1 | 8/2013 | Fleck et al. | |
| 2013/0215395 A1 | 8/2013 | Li | |
| 2015/0042844 A1 | 2/2015 | Shu et al. | |
| 2015/0077599 A1 | 3/2015 | Chen et al. | |

OTHER PUBLICATIONS

Sato, I. et al., "Acquiring a Radiance Distribution to Superimpose Virtual Objects onto a Real Scene," IEEE Transactions on Visualization and Computer Graphics, vol. 5, No. 1, pp. 1-10, Mar. 1999, 10 pages.

Katayama, A. et al., "Shading and Shadow-Casting in Image-Based Rendering Without Geometric Models," SIGGRAPH '99, Aug. 1999, 1 page.

Loscos, C. et al., "Interactive Virtual Relighting of Real Scenes," IEEE Transactions on Visualization and Computer Graphics, vol. 6, No. 4, pp. 289-305, Oct.-Dec. 2000, 17 pages.

Naemura, T. et al., "Virtual Shadows in Mixed Reality Environment Using Flashlight-Like Devices," Annual Conference of the Virtual Reality Society of Japan, vol. 7, No. 2, pp. 227-237, Jan. 1, 2002, 12 pages.

Sugano, N. et al., "The Effects of Shadow Representation of Virtual Objects in Augmented Reality," Second IEEE and ACM International Symposium on Mixed and Augmented Reality, Oct. 7, 2003, 8 pages.

Kingdom, F. et al., "Colour Vision Brings Clarity to Shadows," Perception 2004, vol. 33, pp. 907-914, Jun. 30, 2004, 9 pages.

Konttinen, J. et al., "Real-time Illumination and Shadowing by Virtual Lights in a Mixed Reality Setting," School of Computer Science, University of Central Florida, May 17, 2005, 9 pages.

Santos, P. et al., "Display and Rendering Technologies for Virtual and Mixed Reality Design Review," 7th International Conference on Construction Applications of Virtual Reality, pp. 165-175, Oct. 2007, 11 pages.

Santos, P. et al., "The Daylight Blocking Optical Stereo See-through HMD," Proceedings of the 2008 Workshop on Immersive Projection Technologies/Emerging Display Technologies, pp. 31-34, Aug. 2008, 4 pages.

Knecht, M. et al., "Reciprocal Shading for Mixed Reality," Computers & Graphics, vol. 36, No. 7, pp. 846-856, Nov. 2012, 11 pages.

ISA Korean Intellectual Property Office, International Search Report and Written Opinion for Patent Application No. PCT/US2012/069316, dated Mar. 4, 2013, WIPO, 9 pages.

ISA European Patent Office, International Search Report and Written Opinion for Patent Application No. PCT/US2014/062310, dated Jan. 8, 2015, WIPO, 11 pages.

Azuma, R., "The Challenge of Making Augmented Reality Work Outdoors," Mixed Reality: Merging Real and Virtual Vorlds, Chapter 21, Mar. 1999, 10 pages.

Lutz, B. et al., "Virtual Dunhuang Art Cave: A Cave within a CAVE," Computer Graphics Forum, vol. 18, No. 3, Sep. 1999, 9 pages.

Chuang, Y. et al., "Shadow Matting and Compositing," ACM Transactions on Graphics (TOG)—Proceedings of ACM SIGGRAPH 2003, vol. 22, No. 3, Jul. 2003, 7 pages.

Hughes, C. et al., "Achieving Interactive-Time Realistic Illumination in Mixed Reality," Proceedings of Army Science Conference (ASC) 2004, Orlando, FL, Nov. 29, 2004, 7 pages.

IPEA European Patent Office, Written Opinion of the International Preliminary Examining Authority Issued in Application No. PCT/US2014/062310, dated Oct. 5, 2015, WIPO, 6 pages.

The State Intellectual Property Office of China, First Office Action and Search Report Issued in Chinese Patent Application No. 201280061125.4, dated Dec. 2, 2015, China, 18 pages. (Submitted with partial English translation of Office Action and Search Report).

IPEA European Patent Office, International Preliminary Report on Patentability Issued in PCT Application No. PCT/US2014/062310, dated Jan. 25, 2016, WIPO, 8 pages.

The State Intellectual Property Office of the People's Republic of China, Second Office Action Issued in Application No. 201280061125.4, dated Aug. 3, 2016, China, 6 pages (Submitted with partial English translation of Office Action).

United States Patent and Trademark Office, Non-final Office Action issued in U.S. Appl. No. 13/309,358, dated Jan. 9, 2014, 5 pages.

United States Patent and Trademark Office, Final Office Action issued in U.S. Appl. No. 13/309,358, dated Apr. 24, 2014, 7 pages.

United States Patent and Trademark Office, Notice of Allowance issued in U.S. Appl. No. 13/309,358, dated Jul. 3, 2014, 7 pages.

United States Patent and Trademark Office, Non-final Office Action issued in U.S. Appl. No. 14/520,567, dated May 19, 2016, 19 pages.

United States Patent and Trademark Office, Notice of Allowance issued in U.S. Appl. No. 14/520,567, dated Sep. 13, 2016, 7 pages.

(56) References Cited

OTHER PUBLICATIONS

United States Patent and Trademark Office, Supplemental Notice of Allowance issued in U.S. Appl. No. 14/520,567, dated Nov. 15, 2016, 3 pages.

* cited by examiner

VIRTUAL LIGHT IN AUGMENTED REALITY

CROSS REFERENCE TO RELATED APPLICATIONS

This application is a continuation of U.S. patent application Ser. No. 14/520,567, filed Oct. 22, 2014, which is a continuation of U.S. patent application Ser. No. 13/309,358, filed on Dec. 1, 2011, and titled "VIRTUAL LIGHT IN AUGMENTED REALITY", now U.S. Pat. No. 8,872,853, the entire disclosures of each of which are hereby incorporated herein by reference.

BACKGROUND

Augmented reality typically refers to a view of a physical environment that is augmented with the addition of virtual content. One implementation of augmented reality includes the addition of graphical content to a camera view captured through a camera of a mobile computing device. The camera view and added graphical content may be presented via a graphical display of the mobile computing device to change an appearance of the physical environment or to provide information relating to objects located within the physical environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted display system includes a see-through display. A graphical representation of an illuminated virtual environment is presented via the see-through display of the head-mounted display system to thereby visually augment an appearance of the physical environment to a user viewing the physical environment through the see-through display.

DETAILED DESCRIPTION

Figure 1:
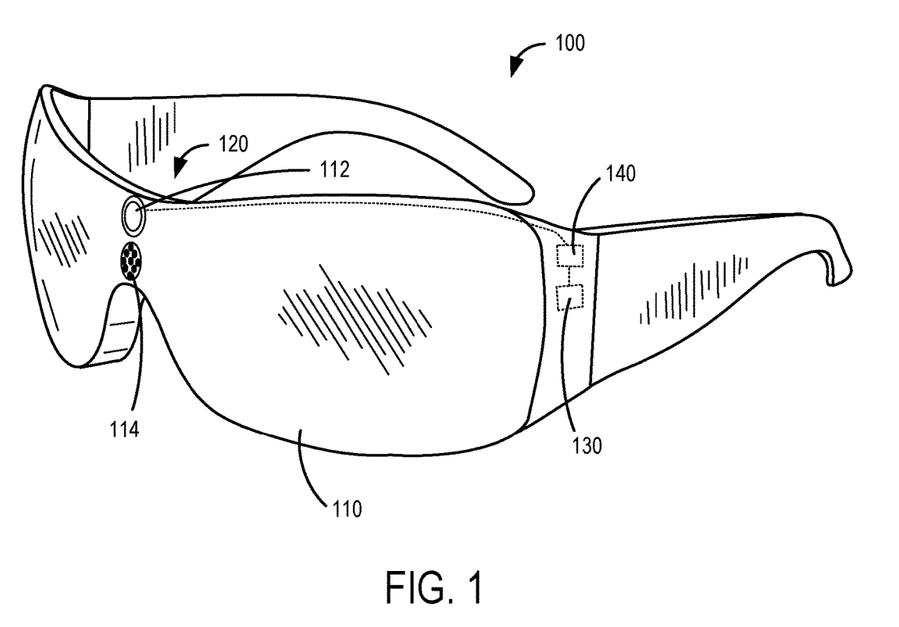
FIG. 1 depicts an example of a head-mounted display system according to one disclosed embodiment.

FIG. 1 depicts an example head-mounted display system 100. Head-mounted display system 100 takes the form of a pair of wearable glasses or goggles in FIG. 1. Head-mounted display system 100 includes a see-through display 110 that is configured to visually augment an appearance of a physical environment to a user viewing the physical environment through see-through display 110. For example, the appearance of the physical environment may be augmented by graphical content that is presented via see-through display 110.

Head-mounted display system 100 includes an optical sensor system 120 that forms a sensory component of head-mounted display system 100. Optical sensor system 120 may include one or more optical sensors (e.g., optical sensors 122 and 124) that observe the physical environment from a similar perspective (e.g., line of sight) as observed by the user through see-through display 110.

Head-mounted display system 100 may further include a position sensor system 130 that forms another sensory component of head-mounted display system 100. Position sensor system 130 may include one or more position sensors that output position sensor information indicating the perspective of the optical sensor system within the physical environment. For example, the position sensor information may include a measurement of location and/or orientation of head-mounted display system 100 in three-dimensional space. Optical sensor information received from optical sensor system 120 and/or position sensor information received from position sensor system 130 may be used by a computing device to model the physical environment and ambient lighting conditions of the physical environment.

Head-mounted display system 100 may include additional electronic components 140, such as a wireless transceiver to wirelessly communicate with a computing device, a portable power source such as a battery for powering the head-mounted display system, logic elements for providing on-board processing capability, data-holding elements for providing on-board data storage capability, and/or other suitable electronic components.

Figure 2A:
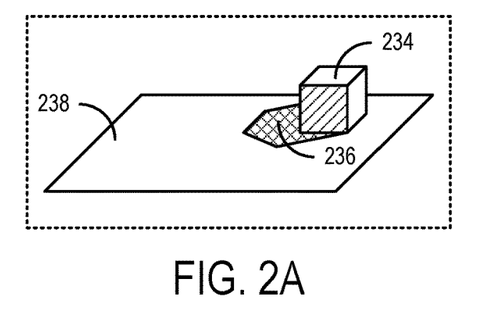
FIG. 2A shows a view of a physical environment through a see-through display without augmentation.

FIG. 2A shows a view of a physical environment through a see-through display without augmentation from a given perspective of a user. The physical environment includes a physical object 234 casting a shadow 236 on a physical surface 238.

Figure 2B:
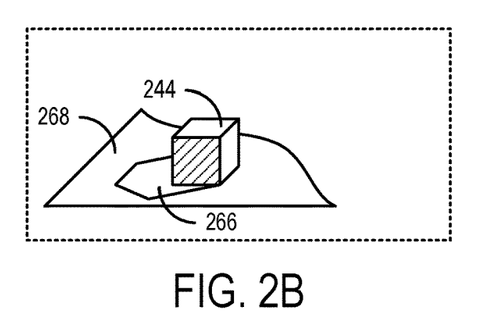
FIG. 2B shows an example of graphical elements displayed on a see-through display to augment the physical environment of FIG. 2A according to a first technique.

FIG. 2B shows an example of graphical elements displayed on a see-through display to augment a physical environment according to a first technique. In FIG. 2B, light is added to regions surrounding virtual shadows so that the virtual shadows appear to be darker than surrounding highlighted regions, thereby providing the appearance of a virtual shadow cast by a virtual object. For example, virtual object 244 is presented via the see-through display with a graphical representation of a non-shadow region 268 bordering a region 266 providing the appearance of a virtual shadow cast by virtual object 244. Non-shadow region 268 may correspond to some or all of a virtual surface representative of physical surface 238. Region 266 representing a virtual shadow may be rendered in some embodiments by omitting or reducing illumination of one or more pixels from a region of the see-through display corresponding to region 266 to provide the appearance of a virtual shadow. FIG. 2B depicts a technique that may be used, for example, in scenarios where the see-through display does not support the ability to selectively reduce or filter the amount of ambient light that is transmitted through portions of the see-through display from the physical environment to the eye or eyes of the user.

Figure 2C:
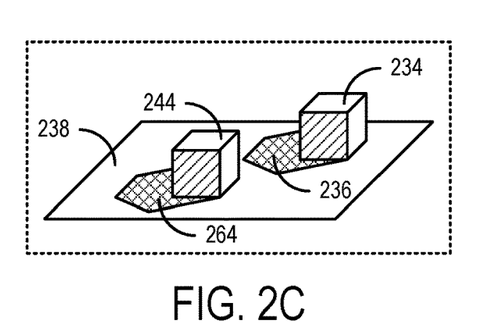
FIG. 2C shows a composite of FIG. 2A and FIG. 2B as would be seen by a user viewing the physical environment through the see-through display while the see-through display augments the physical environment.

FIG. 2C shows a composite of FIG. 2A and FIG. 2B as would be seen by a user viewing the physical environment through the see-through display while the see-through display augments the physical environment. In FIG. 2C, physical object 234 is casting shadow 236 on physical surface 238. Virtual object 244 appears to be casting a virtual shadow 264 onto physical surface 238. Shadow 236 and virtual shadow 264 appear to be cast by the same light source, thereby providing the appearance that virtual object 244 is present in the physical environment.

Figure 2D:
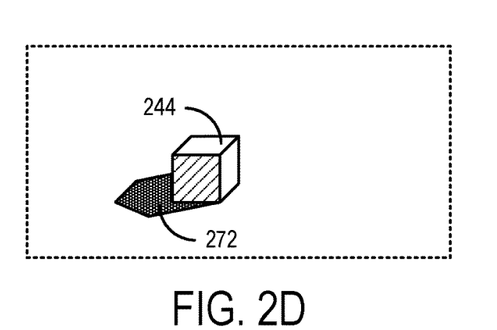
FIG. 2D shows an example of graphical elements displayed on a see-through display to augment the physical environment of FIG. 2A according to a second technique.

FIG. 2D shows another example of graphical elements displayed on a see-through display to augment a physical environment according to a second technique. In contrast to the graphical elements displayed in FIG. 2B, FIG. 2D depicts a technique that may be used, for example, in scenarios where the see-through display supports the ability to selectively reduce or filter the amount of light that is transmitted through portions of the see-through display from the physical environment to an eye or eyes of the user. A graphical representation of virtual object 244 is again presented via the see-through display. However, the amount of ambient light transmitted through the see-through display from the physical environment to an eye or eyes of the user may be selectively reduced and/or filtered at a region 272 corresponding to virtual shadow 264 in FIG. 2C.

While described separately above, the techniques described with reference to FIGS. 2B and 2D may be used in combination, in some embodiments, to provide the appearance of a virtual shadow, such as virtual shadow 264. For example, selective filtering of ambient light passing through the see-through display may be used to darken a region of the see-through display corresponding to the virtual shadow, and a non-shadow region bordering the virtual shadow may be presented via the see-through display to further increase the contrast between the virtual shadow and the surrounding non-shadow region.

Virtual object 244 may be illuminated by application of an ambient lighting model to virtual object 244. As is described in greater detail with reference to FIGS. 3 and 4, an ambient lighting model may be created from observations of the physical environment to determine ambient lighting conditions. The ambient lighting model may seek to create the appearance that virtual objects (e.g., virtual object 244) are illuminated in the same or similar way in which physical objects (e.g., physical object 234) are illuminated by the ambient lighting conditions of the physical environment. For example, in FIG. 2A, physical object 234 is illuminated by the ambient lighting conditions to provide highlighted regions or faces and shaded regions or faces. The ambient lighting model may be applied to virtual object 244 in FIG. 2B or 2D to create a similar appearance of highlighted regions or faces and shaded regions or faces.

Figure 3:
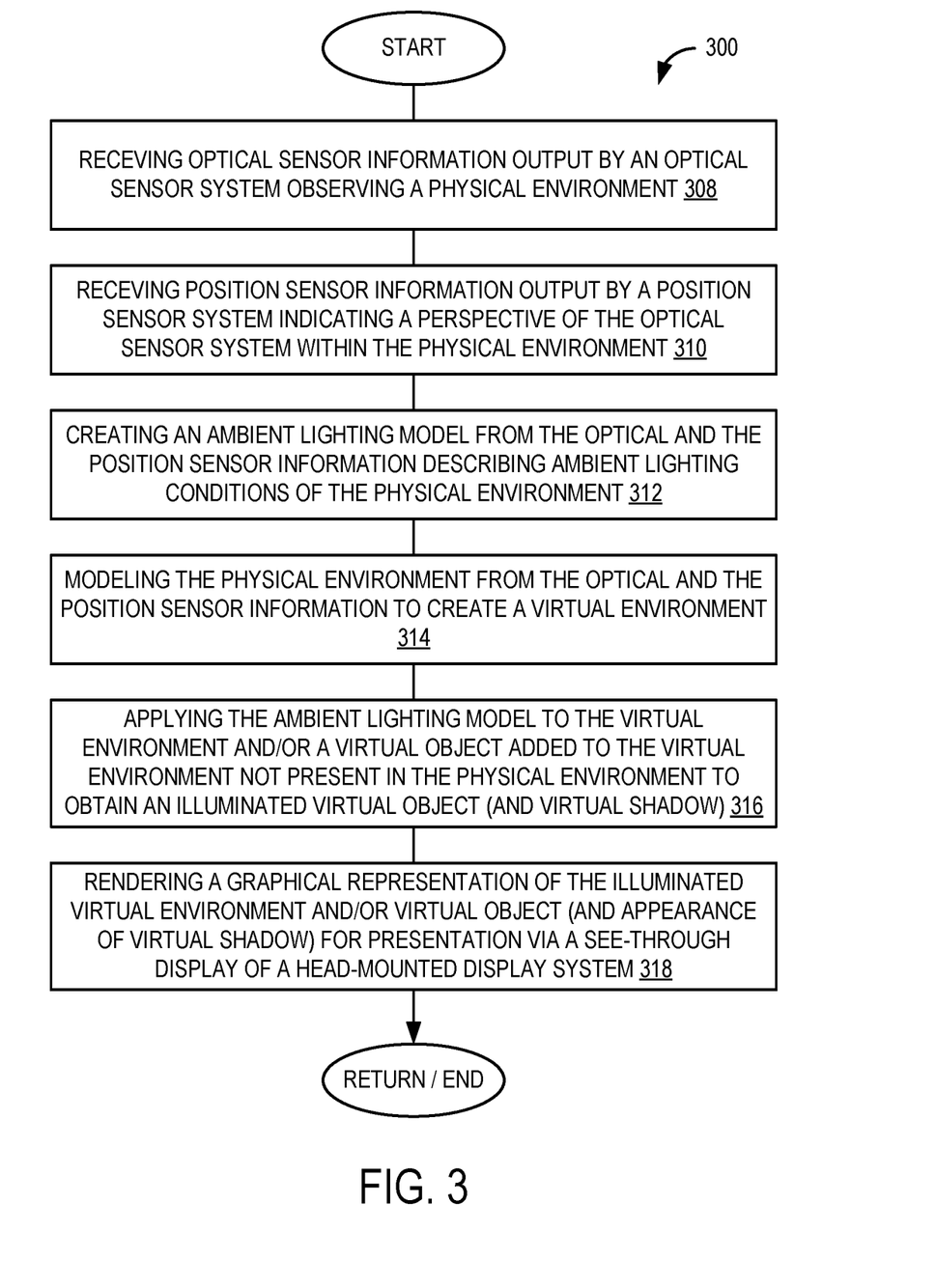
FIG. 3 is a flow diagram depicting an example method for a computing device according to one disclosed embodiment.

FIG. 3 is a flow diagram depicting an example method 300 for a computing device according to one disclosed embodiment. Method 300 may be implemented to create a virtual environment and an ambient light model that may be used to create graphical content that augments a physical environment observed through a see-through display.

At 308, the method includes receiving optical sensor information output by an optical sensor system observing a physical environment. The optical sensor system may include one or more optical sensors, such as a visible spectrum camera and/or an infrared depth camera.

The optical sensor information may include an individual frame of optical sensor information or may include multiple frames (e.g., a time-series of frames) of optical sensor information observed over a period of time. In some embodiments, the optical sensor information may include two or more frames captured via two or more optical sensors of the optical sensor system. For example, a frame of infrared depth information may be received from an infrared depth camera, and a frame of visible spectrum information may be received from a visible spectrum camera. In some embodiments, the optical sensor information may include a combination frame forming a superposition of two or more frames captured via two or more optical sensors.

At 310, the method includes receiving position sensor information output by a position sensor system indicating a perspective of the optical sensor system within the physical environment. The position sensor system may include two or more positions sensors. These positions sensors may take the form of accelerometers, gyroscopes, and/or global positioning system sensors, for example.

In some embodiments, the position sensor information may indicate the perspective of the optical sensor system as a location and/or orientation of the head-mounted display system, or as a measured change in a location and/or orientation of the head-mounted display system within the physical environment. The location of the head-mounted display system may be measured in three-dimensional space along three orthogonal axes (e.g., x, y, z), and an orientation (roll, pitch, yaw) of the head-mounted display system about the three orthogonal axes.

At 312, the method includes creating an ambient lighting model from the optical sensor information and position sensor information describing ambient lighting conditions of the physical environment. The optical sensor information and position sensor information may be combined in method 300 to create the ambient lighting model by aligning a frame of the optical sensor information with a measurement of the location and/or orientation provided by the position sensor information corresponding to the perspective of the optical sensor system at the time the frame was captured.

In some embodiments, the ambient lighting model may describe one or more parameters such as a light vector, a light intensity, and/or a light color of the ambient lighting conditions. These parameters may be defined on a per-pixel basis in some embodiments, or may be defined for a region of pixels or the entire viewing region of the see-through display.

A light vector may approximate one or more paths that ambient light travels within a physical environment from a light source. The light vector may be represented in three-dimensional space. In some embodiments, a light vector may be identified using computer vision, such as from line, edge, or corner detection/recognition of shadows physically present within the physical environment that are observed by the optical sensor system. As another example, a light vector may be identified from a comparison of a relative brightness of surfaces within the physical environment, where each surface has an orientation that may be defined as a measurement of the surface normal to the light vector. A light color may be represented, for example, as an RGB value that approximates a color of the ambient lighting conditions within the physical environment. A light intensity may be represented, for example, as a brightness of the light source or light sources that define the ambient lighting conditions within the physical environment.

In some embodiments, a location of a light source within the physical environment may be identified from the optical sensor information, or from a combination of the optical sensor information and position sensor information identifying a location and/or orientation of the head-mounted display system within the physical environment. For example, some light sources may be directly observed from the optical sensor information as a region of relatively high light intensity and/or thermal intensity as compared to other regions of the physical environment. Once a light source is directly observed from the optical sensor information, position sensor information received from the position sensor system may be used to identify a location of the light source within three-dimensional space of the physical environment.

At 314, the method includes modeling the physical environment from the optical sensor information and the position sensor information to create a virtual environment. In some embodiments, the virtual environment may be defined by a two-dimensional or three-dimensional mesh (e.g., a wireframe mesh) having a number of points, vertices, lines, and/or surfaces, etc. As one example, computer vision in the form of object recognition, and/or line, edge, or corner detection/recognition may be used to identify and model physical objects that are present within the physical environment. These physical objects may be approximated with any suitable number and/or combination of points, vertices, lines, surfaces, etc. Again, the optical sensor information and position sensor information may be combined in method 300 to create the virtual environment by aligning a frame of the optical sensor information with a measurement of the location and/or orientation provided by the position sensor information corresponding to the perspective of the optical sensor system at the time the frame was captured. Furthermore, in some embodiments, the virtual environment or a portion thereof may be received from another source or may be modeled from the physical environment using information derived from a source other than the optical sensor information and/or position sensor information of the head-mounted display system.

At 316, the method includes applying the ambient lighting model to the virtual environment to obtain an illuminated virtual environment. The virtual environment may include one or more added virtual objects not present in the physical environment such that application of the ambient lighting model to an added virtual object creates an illuminated virtual object.

As one example, the ambient lighting model may be applied to the virtual environment or to a virtual object within the virtual environment by adding a virtual light source at a location within the virtual environment that approximates the light vector, light intensity, and/or light color of the ambient lighting conditions within the physical environment.

While the ambient lighting model may be created by observing, for example, the way physical objects are illuminated by the ambient lighting conditions, light sources within the physical environment may also be directly observed via the optical sensor system. A location of the light source within the physical environment may be identified from the position sensor information indicating the perspective of the optical sensor system at the time of observation of the light source. A virtual light source may be added to the virtual environment at a location that approximates the location of the light source identified within the physical environment. Again, this virtual light source may be defined within the virtual environment to approximate the light vector, light intensity, and/or light color of the ambient lighting conditions within the physical environment.

The method at 316 may further include applying the ambient lighting model to the virtual environment to obtain a virtual shadow and/or a virtual reflection of the illuminated virtual object projected on a virtual surface within the virtual environment. For example, as previously described with reference to FIG. 2A, a virtual shadow of a virtual object added to the virtual environment is not present in the physical environment.

At 318, the method includes rendering a graphical representation of the illuminated virtual environment and/or added virtual object for presentation via a see-through display of the head-mounted display system. The method at 318 may further include rendering an appearance of the virtual shadow cast by the virtual object. The appearance of the virtual shadow may be rendered using a number of different techniques depending upon the capabilities of the see-through display of the head-mounted display system.

As one example, the see-through display does not support the ability to selectively reduce the amount of light that is transmitted through portions of the see-through display from the physical environment to the eye or eyes of the user. Accordingly, the see-through display may be configured to visually augment the appearance of the physical environment by adding light to the scene viewed by the user by the presentation of graphical elements. In this scenario, the appearance of the virtual shadow may be provided by adding light to regions other than the region representing the virtual shadow so that the virtual shadow appears darker than surrounding regions where light has been added. For example, one or more pixels of a region representing the virtual shadow may be omitted from being illuminated by the see-through display to further darken the region representing the virtual shadow.

As another example, the see-through display is capable of selectively reducing the amount of light that is transmitted through portions of the see-through display from the physical environment to an eye of the user. For example, the see-through display may include a light filter that can be modulated on a per pixel basis to allow different amounts of ambient light to pass through the see-through display. Here, the appearance of the virtual shadow may be provided by the see-through display reducing or filtering ambient light at a region of the see-through display representing the virtual shadow.

Figure 4:
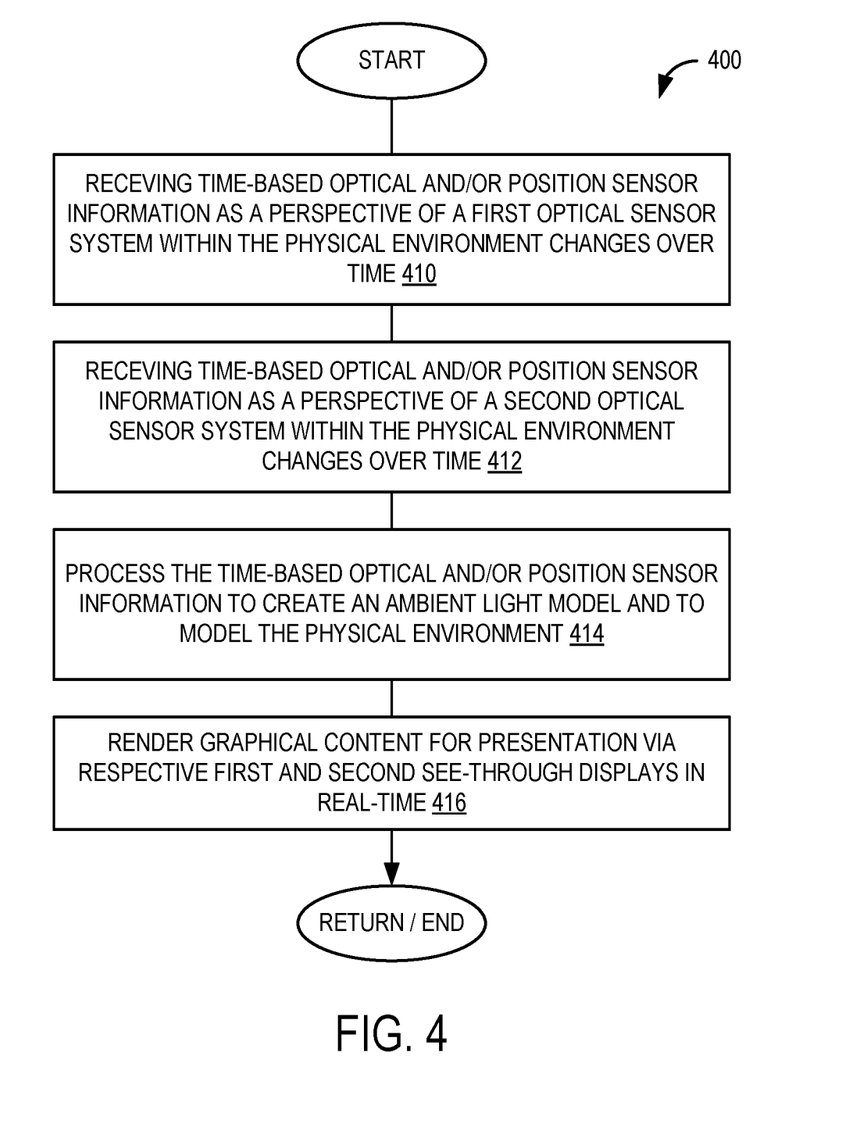
FIG. 4 is a flow diagram depicting another example method for a computing device according to one disclosed embodiment.

FIG. 4 is a flow diagram depicting an example method 400 for a computing device according to one disclosed embodiment. While method 300 may be performed on an individual frame of optical sensor information, method 400 describes use of multiple frames of optical sensor information observed over a period of time, for example, as a user changes a viewing perspective within the physical environment.

At 410, the method includes receiving time-based optical sensor information output by a first optical sensor system observing a physical environment as a perspective of the first optical sensor system within the physical environment changes over time. The first optical sensor system may form a sensory component of a first head-mounted display system having a first see-through display. The perspective of the first optical sensor system may change as a first user's head rotates and/or translates within the physical environment. As one example, the time-based optical sensor information may include multiple time-series frames of optical sensor information having an order corresponding to the order by which the frames were received from the first optical sensor system over a period of time.

The method at 410 may further include receiving time-based position sensor information output by a first position sensor system indicating a perspective of the first optical sensor system within the physical environment as the perspective of the first optical sensor system within the physical environment changes over time. The first position sensor system may form another sensory component of the first head-mounted display system. The time-based position sensor information may include multiple time-series measurements of location and/or orientation of the first head-mounted display system.

At 412, the method includes receiving time-based optical sensor information output by a second optical sensor system observing the physical environment as a perspective of the second optical sensor system within the physical environment changes over time. The second optical sensor system may form a sensory component of a second head-mounted display system having a second see-through display. The perspective of the second optical sensor system may change as a second user's head rotates and/or translates within the physical environment. The time-based optical sensor information may include multiple time-series frames of optical sensor information having an order corresponding to the order by which the frames were received from the second optical sensor system over a period of time. At any given time, the perspective of the first optical sensor system is necessarily different from the perspective of the second optical sensor system, since both optical sensor systems cannot occupy the same physical space at the same time.

The method at 412 may further include receiving time-based position sensor information output by a second position sensor system indicating a perspective of the second optical sensor system within the physical environment as the perspective of the second optical sensor system within the physical environment changes over time. The second position sensor system may form another sensory component of the second head-mounted display system. The time-based position sensor information may include multiple time-series measurements of location and/or orientation of the second head-mounted display system.

In some implementations, optical sensor information and/or position sensor information may be received from one or more of the first optical sensor system and/or the second optical sensor system over a wide area communications network. For example, the first optical sensor system forming a sensory component of the first head-mounted display system may reside at a geographically remote location from the computing device that performs method 400.

At 414, the method includes processing the time-based optical sensor information output by the first optical sensor system and the time-based position sensor information output by the first position sensor system to create an ambient light model and/or to model the physical environment to create a virtual environment. Accordingly, the ambient lighting model and the virtual environment may be based on multiple time-series frames of the optical sensor information and multiple time-series measurements of the time-based position sensor information obtained from the first head-mounted display system. In some embodiments, the time-series frames of optical sensor information may be aligned in time with the multiple time-series measurements of the position sensor information indicating the perspective of the first optical sensor system. In some embodiments, interpolation and/or other analysis of the multiple time-series frames and/or measurements may be used to identify parameters of the ambient lighting conditions and to model the physical environment.

The method at 414 may further include processing the time-based optical sensor information output by the second optical sensor system and the time-based position sensor system output by the second position sensor system to create or refine the ambient light model and the virtual environment. Accordingly, the ambient lighting model and the virtual environment may be further based on multiple time-series frames of the optical sensor information and multiple time-series measurements of the time-based position sensor information obtained from the second head-mounted display system. In some embodiments, the time-series frames of optical sensor information may be aligned in time with the multiple time-series measurements of the position sensor information indicating the perspective of the second optical sensor system. The time-series frames and/or measurements obtained from the first head-mounted display system may also be aligned with the time-series frames and/or measurements obtained from the second head-mounted display system to create or refine the ambient light model and the virtual environment. Analysis of the information obtained from the first head-mounted display system and the information obtained from the second head-mounted display system may be used to further refine or create the ambient light model and/or virtual environment.

The processing performed at 414 of method 400 may include previously described aspects of method 300, including the creation of an ambient light model at 312, modeling of the physical environment to create a virtual environment at 314, and application of the ambient lighting model to virtual objects added to the virtual environment at 316. However, in method 400, the multiple optical sensor systems and/or position sensor systems of independent head-mounted display systems provide multiple concurrent perspectives of the physical environment, enabling the ambient light model and virtual environment to be more rapidly and/or more accurately created. Accordingly, the ambient lighting model may be created from a combination of optical sensor information and/or position sensor information received from independent head-mounted display systems and/or received from a single head-mounted display system over a period of time.

At 416, the method includes rendering graphical content for presentation in real-time via respective first and second see-through displays. For example, graphical content in the form of one or more rendered graphical representations of virtual objects and/or appearance of virtual shadows may be presented via the first see-through display corresponding to the current perspective of the first optical sensor system. Graphical content in the form of one or more rendered graphical representations of virtual objects and/or the appearance of virtual shadows may be presented via the second see-through display corresponding to the current perspective of the second optical sensor system, which may differ from the current perspective of the first optical sensor system. Accordingly, graphical representations of illuminated virtual objects and the appearance of virtual shadows may be rendered in real-time as the perspective of the optical sensor system within the physical environment changes over time.

As another example, the use of multiple optical sensor systems within a common physical environment enables a first optical sensor system of a first user to observe a second user within the physical space, which may thereby enable an appearance of a virtual shadow of the second user to be presented to the second user via a respective head-mounted display system.

As used above, the term "real-time" may refer to the rendering and presentation of graphical content that corresponds to and is proximate in time with a current perspective of the physical environment (e.g., as viewed through a see-through display by a user and as observed by an optical sensor system associated with the see-through display). Accordingly, a real-time presentation of graphical content in the context of a see-through display augments an appearance of the physical environment to the user viewing the physical environment through the see-through display without introduction of an unsuitable amount of delay that would result in misalignment of a virtual environment (or virtual objects added to the virtual environment) with a current perspective of the physical environment as the perspective of the physical environment changes or moves over time.

In some embodiments, the above described methods and processes may be tied to a computing system including one or more computers. In particular, the methods and processes described herein may be implemented as a computer application, computer service, computer API, computer library, and/or other computer program product.

Figure 5:
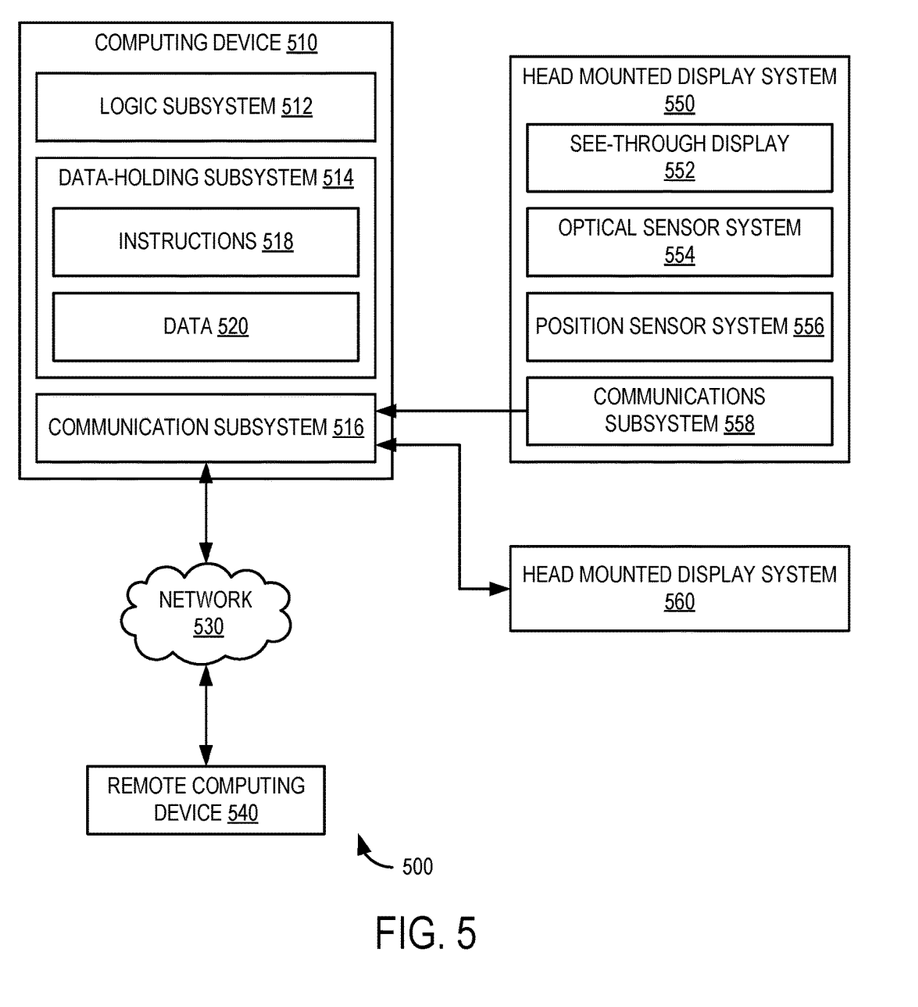
FIG. 5 is a schematic diagram of a computing system according to one disclosed embodiment.

FIG. 5 schematically shows a nonlimiting computing system 500 including a computing device 510 that may perform one or more of the above described methods and processes. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc.

Computing device 510 of computing system 500 includes a logic subsystem 512 and a data-holding subsystem 514. Computing device 510 of computing system 500 may optionally include a communication subsystem 516, and/or other components not shown in FIG. 5. Computing system 500 may also optionally include user input devices such as keyboards, mice, game controllers, cameras, microphones, and/or touch screens, for example.

Logic subsystem 512 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 514 may include one or more physical, non-transitory, devices configured to hold data and/or instructions executable by the logic subsystem to implement the herein described methods and processes. When such methods and processes are implemented, the state of data-holding subsystem 514 may be transformed (e.g., to hold different data).

Data-holding subsystem 514 may include removable media and/or built-in devices. Data-holding subsystem 514 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 514 may include devices with one or more of the following characteristics: volatile, nonvolatile, dynamic, static, read/write, read-only, random access, sequential access, location addressable, file addressable, and content addressable. In some embodiments, logic subsystem 512 and data-holding subsystem 514 may be integrated into one or more common devices, such as an application specific integrated circuit or a system on a chip.

It is to be appreciated that data-holding subsystem 514 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, a display subsystem such as a see-through display may be used to present a visual representation of data held by data-holding subsystem 514. As the herein described methods and processes change the data held by the data-holding subsystem, and thus transform the state of the data-holding subsystem, the state of the display subsystem may likewise be transformed to visually represent changes in the underlying data. A display subsystem may include one or more display devices utilizing virtually any type of technology. Such display devices may be combined with logic subsystem 512 and/or data-holding subsystem 514 in a shared enclosure, or such display devices may be peripheral display devices.

When included, communication subsystem 516 may be configured to communicatively couple computing device 510 with one or more other computing devices, such as remote computing device 540. Communication subsystem 516 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing device 510 to send and/or receive messages to and/or from other devices via network 530 such as the Internet.

Computing system 500 further includes one or more head-mounted display systems, such as head-mounted display systems 550 and 560 depicted schematically in FIG. 5. Head-mounted display system 550 is depicted in further detail, including a see-through display 552, an optical sensor system 554, a position sensor system 556, and a communication subsystem 558. Head-mounted display system 560 may similarly include a see-through display, optical sensor system, position sensor system, and communication subsystem. Previously described head-mounted display system 100 of FIG. 1 provides a non-limiting example of head-mounted display systems 550 and 560. Head-mounted display systems 550 and 560 may communicate with computing device 510 and/or remote computing device 540 via wired or wireless communications. In some embodiments, a head-mounted display system may include an onboard computing device 510.

See-through display 552 may be configured to visually augment an appearance of a physical environment to a user viewing the physical environment through the see-through display. For example, the appearance of the physical environment may be augmented by graphical content (e.g., one or more pixels each having a respective color and brightness) that is presented via the see-through display. The see-through display may be configured so that a user is able to view a real object in physical space through one or more partially transparent pixels that are displaying a virtual object. In some embodiments, see-through display 552 may support selective filtering of light received from the physical environment before reaching an eye of a user wearing the head-mounted display system. Such filtering may be performed on individual pixels or on groups of pixels. As one example, the selective filtering or removal of ambient light may be supported by the see-through display at a different resolution (e.g., a lower resolution or a higher resolution) than the resolution supported by the see-through display for the presentation of lighted graphical content (e.g., illuminated pixels). In some embodiments, see-through display 552 may include a first display layer that adds light in the form of one or more illuminated pixels, and a second display layer that filters ambient light received from the physical environment. These layers may have different display resolution, pixel density, and/or display capabilities.

Optical sensor system 554 may include one or more optical sensors for observing visible spectrum and/or infrared light of the ambient lighting conditions of a physical environment. One or more of these optical sensors may take the form of a depth camera. Time-resolved images from one or more of these depth cameras may be registered to each other and/or images from another optical sensor such as a visible spectrum camera, and may be combined to yield depth-resolved video.

A depth camera may be take the form of a structured light depth camera configured to project a structured infrared illumination comprising numerous, discrete features (e.g., lines or points). The depth camera may be configured to image the structured illumination reflected from a scene onto which the structured illumination is projected. A depth map of the scene may be constructed based on spacings between adjacent features in the various regions of an imaged scene.

A depth camera may take the form of a time-of-flight depth camera configured to project a pulsed infrared illumination onto a scene. This depth camera may be configured to detect the pulsed illumination reflected from the scene. Two or more of these depth cameras may include electronic shutters synchronized to the pulsed illumination, but the integration times for the two or more depth cameras may differ, such that a pixel-resolved time-of-flight of the pulsed illumination, from the source to the scene and then to the depth cameras, is discernable from the relative amounts of light received in corresponding pixels of the two depth cameras.

Position sensor system 556 may include one or more position sensors. These positions sensors may include accelerometers and/or gyroscopes that provide an indication or measurement of a location and/or orientation of the head-mounted display system in multi-dimensional space. As one example, position sensor system 556 may be configured as a six-axis or six-degree of freedom position sensor system. This example position sensor system may, for example, include three accelerometers and three gyroscopes to indicate or measure a change in location of the head-mounted display system within three-dimensional space along three orthogonal axes (e.g., x, y, z) and a change in an orientation of the head-mounted display system about the three orthogonal axes (e.g., roll, pitch, yaw).

Position sensor system 556 may support other suitable positioning techniques, such as GPS or other global navigation system. For example, position sensor system 556 may include a wireless receiver (e.g., a GPS receiver or cellular receiver) to receive wireless signals broadcast from satellites and/or terrestrial base stations. These wireless signals may be used to identify a geographic location of the head-mounted display system. Positioning information obtained from wireless signals received by the head-mounted display system may be combined with positioning information obtained from other position sensors, such as accelerometers and/or gyroscopes to provide an indication of location and/or orientation of the head-mounted display system. While specific examples of position sensor systems have been described, it will be appreciated that other suitable position sensor systems may be used.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for a head mounted display (HMD), comprising:
observing ambient lighting conditions of a physical environment;
assessing a perspective of the HMD;
visually augmenting an appearance of the physical environment with a virtual object; and
creating an illusion of a virtual shadow of the virtual object by virtually illuminating a non-virtual-object, non-shadow region bordering the virtual shadow, an appearance of the non-virtual-object, non-shadow region being based on the observed ambient lighting conditions.

2. The method of claim 1, wherein the virtual shadow is rendered with one or more omitted pixels.

3. The method of claim 1, wherein the non-shadow region is displayed with relatively more see-through lighting than the virtual shadow.

4. The method of claim 1, wherein the virtual shadow is positioned in accordance with an ambient lighting model describing ambient lighting conditions of the physical environment.

5. A method for a head mounted display (HMD), comprising:
observing ambient lighting conditions of a physical environment; and
visually augmenting an appearance of the physical environment with a virtual object and a graphical representation of a non-virtual-object, non-shadow region bordering a virtual shadow of the virtual object, an appearance of the graphical representation of the non-virtual-object, non-shadow region being based on the observed ambient lighting conditions.

6. The method of claim 5, wherein the virtual shadow is positioned in accordance with an ambient lighting model describing ambient lighting conditions of the physical environment.

7. The method of claim 6, wherein the ambient lighting model is created based on ambient lighting conditions observed by a plurality of optical sensor systems, and at least one of the plurality of optical sensors systems is separate from the HMD.

8. The method of claim 5, wherein the non-shadow region is visually illuminated.

9. The method of claim 5, wherein the non-shadow region is displayed with relatively more see-through lighting than the virtual shadow.

10. The method of claim 5, further comprising calculating a light vector from the observed ambient lighting conditions, and wherein the virtual shadow is positioned such that the light vector points from a perceived position of the virtual object to a perceived position of the virtual shadow.

11. The method of claim 5, further comprising calculating a light intensity from the observed ambient lighting conditions, and wherein a brightness of the graphical representation of the non-shadow region is a function of the light intensity.

12. The method of claim 5, further comprising assessing a perspective of the HMD within the physical environment.

13. The method of claim 12, wherein the graphical representation of the non-shadow region is changed as the perspective of the HMD within the physical environment changes over time.

14. A method for a head mounted display (HMD), comprising:
observing ambient lighting conditions of a physical environment; and
visually augmenting an appearance of the physical environment with a virtual object and a graphical representation of a non-virtual-object, non-shadow region bordering a virtual shadow of the virtual object, an appearance of the graphical representation of the non-virtual-object, non-shadow region being based on the observed ambient lighting conditions, and the graphical representation of the non-virtual-object, non-shadow region appearing to brighten an area exterior the virtual shadow while leaving the virtual shadow relatively darker.

15. The method of claim 14, further comprising creating an ambient lighting model describing ambient lighting conditions of the physical environment.

16. The method of claim 15, wherein the ambient lighting model is created based on ambient lighting conditions observed by a plurality of optical sensor systems, and at least one of the plurality of optical sensors systems is separate from the HMD.

17. The method of claim 14, further comprising calculating a light vector from the observed ambient lighting conditions, and wherein the virtual shadow is positioned such that the light vector points from a perceived position of the virtual object to a perceived position of the virtual shadow.

18. The method of claim 14, further comprising calculating a light intensity from the observed ambient lighting conditions, and wherein a brightness of the graphical representation of the non-shadow region is a function of the light intensity.

19. The method of claim 14, further comprising assessing a perspective of the HMD within the physical environment.

20. The method of claim 19, wherein the graphical representation of the non-shadow region is changed as the perspective of the HMD within the physical environment changes over time.

* * * * *